(No Model.)

W. E. SMITH.
NUT LOCK.

No. 595,215. Patented Dec. 7, 1897.

Witnesses
R. A. Shepard
H. J. Riley

Inventor
William E. Smyth
By his Attorneys,
C. A. Snow & Co.

UNITED STATES PATENT OFFICE.

WILLIAM E. SMITH, OF GRENADA, MISSISSIPPI, ASSIGNOR OF TWO-FIFTHS TO B. E. MOORE, OF SAME PLACE.

NUT-LOCK.

SPECIFICATION forming part of Letters Patent No. 595,215, dated December 7, 1897.

Application filed July 20, 1897. Serial No. 645,243. (No model.)

*To all whom it may concern:*

Be it known that I, WILLIAM E. SMITH, a citizen of the United States, residing at Grenada, in the county of Grenada and State of Mississippi, have invented a new and useful Nut-Lock, of which the following is a specification.

The invention relates to improvements in nut-locks.

The object of the present invention is to improve the construction of nut-locks and to provide a simple, inexpensive, and efficient device for locking the nut against accidental unscrewing.

A further object of the invention is to provide a nut-lock which will not require any alteration of a bolt or interfere with the threads of the same or the nut and which will permit the latter to be readily removed when desired without injuring any of the parts.

The invention consists in the construction and novel combination and arrangement of parts, as hereinafter fully described, illustrated in the accompanying drawings, and pointed out in the claims hereto appended.

Figure 1:
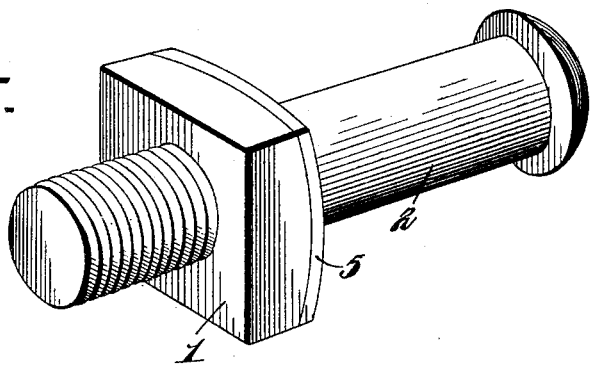
Figure 2:
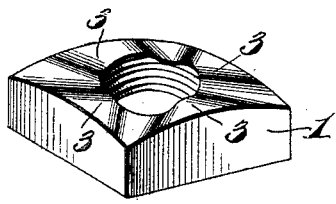
Figure 4:
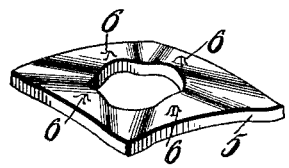
Figure 3:
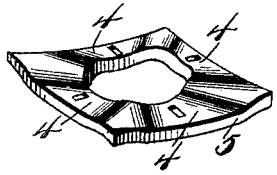
Figure 5:
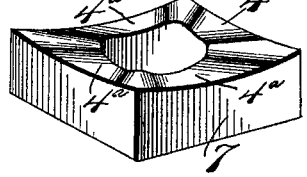

In the drawings, Figure 1 is a perspective view of a nut-lock constructed in accordance with this invention. Fig. 2 is a detail perspective view of the nut, showing the inner engaging face thereof. Fig. 3 is a detail perspective view of the spring-washer. Fig. 4 is a similar view showing the opposite side thereof. Fig. 5 is a detail perspective view of the washer, illustrating a modification of the invention.

Like numerals of reference designate corresponding parts in the several figures of the drawings.

1 designates a nut having the usual threaded opening and adapted to screw on a bolt 2 in the usual manner, and it is provided at its inner engaging face, which is convex, with a series of substantially convex protuberances 3, adapted to fit in corresponding depressions 4 of a spring-washer 5, whereby the nut is locked against accidental unscrewing. The washer 5, which is constructed of a plate of resilient material, presents an outer concave face and an inner convex face and is adapted to abut against a fish-plate or any other surface, and it is provided on such abutting face with protuberances 6, adapted to obtain a hold on a surface. The convex enlargements or protuberances of the nut form oppositely-beveled faces, so that the nut is adapted to ride readily over a washer, and the resiliency of the latter will enable a nut to be screwed tightly against the abutting surface without liability of injuring the threads. Any number of enlargements or protuberances may be provided, and they may be arranged on nuts of any shape.

Instead of employing a spring-washer a washer 7 of heavy material may be employed, and the depressions $4^a$ formed therein are preferably constructed by grooving or recessing the surface thereof. The washers may engage suitable recesses of the abutting surface or be held stationary in any suitable manner, and the nut-lock is applicable to rail-joints, bridges, machinery, and various other constructions subject to vibration, where it is desirable to lock a nut against accidental unscrewing. It also can be advantageously employed on axles and similar machinery and devices.

The invention has the following advantages: The nut-lock is exceedingly simple and inexpensive in construction and the slightest spring in the washer permits it to give and allow a nut to be screwed up very tight without injuring the screw-threads in the least. It will permit a nut to be readily removed without injuring any of the parts, and either thin or heavy washers may be employed, according to the character of the construction to which the nut-lock is to be applied.

What I claim is—

1. A nut-lock comprising a bolt, a nut arranged on the bolt and having a convex inner face provided with a series of substantially convex enlargements, and a washer having a concave outer face and a convex inner face and provided in its outer face with a series of substantially concave recesses or depressions adapted to receive the enlargements of the nut, substantially as and for the purpose described.

2. A nut-lock comprising a bolt, a nut arranged on the bolt and having a convex inner face provided with a series of substantially convex enlargements, and a substantially concavo-convex washer constructed of resilient material and provided in its outer or concave face with a series of depressions receiving the enlargements of the nut, said washer being adapted to spring sufficiently to permit the nut to be forced over it, substantially as described.

In testimony that I claim the foregoing as my own I have hereto affixed my signature in the presence of two witnesses.

WILLIAM E. SMITH.

Witnesses:
R. HORTON,
JNO. MCLEOD.